United States Patent [19]

Wissmann

[11] Patent Number: 5,602,200
[45] Date of Patent: Feb. 11, 1997

[54] POLYAMIDE/POLYOLEFIN BLENDS

[75] Inventor: Rolf B. Wissmann, Taunus, Germany

[73] Assignee: E. I. Du Pont de Nemours and Company, Wilmington, Del.

[21] Appl. No.: 519,330

[22] Filed: Aug. 25, 1995

Related U.S. Application Data

[63] Continuation of Ser. No. 196,222, filed as PCT/US92/07966, Sep. 24, 1992, published as WO93/06175, Apr. 1, 1993, abandoned.

[30] Foreign Application Priority Data

Sep. 25, 1991 [DE] Germany .................. 4131908.7

[51] Int. Cl.$^6$ .................................. C08G 63/48
[52] U.S. Cl. .................. 525/66; 525/63; 525/179; 525/183; 528/310; 528/318; 528/335
[58] Field of Search .................. 525/66, 63, 179, 525/183; 528/310, 318, 335

[56] References Cited

U.S. PATENT DOCUMENTS

| | | | |
|---|---|---|---|
| 4,305,865 | 12/1981 | Okada et al. | 525/66 |
| 4,404,312 | 9/1983 | Kokubu et al. | 524/504 |
| 4,912,150 | 3/1990 | Ushiroji et al. | 524/504 |
| 4,988,764 | 1/1991 | Nishio et al. | 525/66 |
| 5,006,601 | 4/1991 | Lutz et al. | 525/66 |
| 5,013,789 | 5/1991 | Sakuma et al. | 525/66 |
| 5,140,059 | 8/1992 | Simoens | 524/504 |
| 5,234,993 | 8/1993 | Huyah-Ba | 525/66 |

FOREIGN PATENT DOCUMENTS

| | | | |
|---|---|---|---|
| 0346149A2 | 12/1989 | European Pat. Off. | C08L 23/12 |
| 0475400A1 | 3/1992 | European Pat. Off. | C08L 77/00 |
| 60-179455 | 2/1986 | Japan | C08L 77/00 |
| 61-028539 | 6/1986 | Japan | C08L 23/10 |
| 62-158739 | 7/1987 | Japan | C08L 23/10 |
| 62-158740 | 12/1987 | Japan | C08L 23/12 |
| 63-305148 | 4/1989 | Japan | C08L 23/10 |

*Primary Examiner*—James J. Seidleck
*Assistant Examiner*—Duc Truong
*Attorney, Agent, or Firm*—P. Michael Walker

[57] ABSTRACT

A polymeric composition includes a polyamide; an unmodified polypropylene or unmodified polyethylene; optionally a carboxylic acid or maleic anhydride-grafted ethylene-propylene-diene elastomer; and a carboxylic acid or maleic anhydride-grafted polyethylene or polypropylene.

13 Claims, No Drawings

POLYAMIDE/POLYOLEFIN BLENDS

CROSS REFERENCE TO RELATED APPLICATIONS

This is a continuation of my application Ser. No. 08/196,222 filed Mar. 22, 1994, now abandoned which claims priority of International Application No. PCT/US92/07906 filed on Sep. 24, 1992 and published on Apr. 1, 1993 as WO 93/06175.

FIELD OF THE INVENTION

This invention relates to blends of polyamide and polyolefin polymers and more particularly to such blends which have an improved homogeneity in injection molded articles.

BACKGROUND DISCUSSION

Polyamide resins such as polyamide 6.6 and polyamide 6 are very strong resins well suited for molding of various articles; however, such resins are sensitive to moisture. To reduce moisture pick-up, polyolefins such as polypropylene or polyethylene are added to the polyamide. However, due to the polar nature of polyamides and the non-polar nature of polyolefins, blending of such resins leads to compatibility problems.

Physical melt blending of a polyamide and a polyolefin does not result in acceptable end-use properties due to insufficient compatibility. This results in severe delamination particularly in injection molded articles, and moisture absorption is actually increased compared to the pure polyamide.

It is known that in order to improve the compatibility of polyamides and polyolefins, the addition of a modified polyolefin that is able to interact with the end-groups of the polyamide is necessary. The modification of polyolefins is obtained by, for example, reacting it with an unsaturated carboxylic acid, such as fumaric acid for example, or the anhydride thereof, such as maleic anhydride, as described, for example, in European Patent Application 370,736. Various compositions of grafted polyolefin compatibilized blends of polyamide and polyolefins are known and the patent disclosure in this area is plentiful.

In order to enhance compatibility between a polyamide and a polyolefin such as polypropylene or polyethylene, it has been suggested to either add the modified polyolefin to a blend of polyamide and unmodified polyolefin or to blend only modified polyolefin with the polyamide.

The general disadvantage of thus compatibilized blends is their relatively low overall toughness. Pat. No ES 8,305,395 to Du Pont describes a combination of a polyamide and a maleic acid or anhydride grafted polyethylene which may generally cover the use of a grafted polyolefin as compatibilizer for polyamide/polyolefin blends.

For improving impact strength of polyamide/polyolefin blends, it has been suggested to use both a modified polyolefin such as polypropylene for example and a modified elastomer or to use only a modified elastomer. While the use of only a modified elastomer does improve impact properties somewhat, it usually yields resins with anisotropic properties due to insufficient homogeneity and a laminar type morphology. The use of higher concentrations of modified elastomer can improve morphology somewhat, but at the expense of a significant reduction in flexural modulus. As to the use of both, i.e. modified polyolefin and modified elastomer, it has been proposed to either simultaneously modify polyamide, unmodified polypropylene and elastomer (Japanese patent HEI 1(1989)-103662), to simultaneously modify polypropylene and elastomer (EP 194-705-A and EP 235-876-A, for example) or to separately modify polypropylene and elastomer (Jap. 60053-550-A).

However, while the compatibilization and toughness of polyamide and polyolefin can be improved effectively by the use of such modified polyolefins and modified elastomers, 'macroscopic morphology' in injection molded articles of those kinds of blends is still insufficient, which is even more so in blends which are richer in polyamide than in polyolefin. The term 'macroscopic morphology' refers to the perceived integrity and appearance of injection molded parts throughout the cross section of an injection molded article, opposed to 'microscopic morphology' which is usually determined by Transmission Electron Microscopy (TEM). Experience has shown that, while compatibilized blends of polyamide and polyolefin can exhibit very good 'microscopic morphology', with the polyolefin phase finely dispersed within a continuous polyamide phase, and with a very high surface gloss, the 'macroscopic morphology' of the same blend can be very poor, as manifested by delamination of the complete surface layer of molded articles. This kind of delamination appears to be more severe for parts with a large surface area and a radial flow pattern; however, delamination of the surface layer with such poorly compatibilized blends can also be seen in the sprue and runner system of smaller parts. The chemical composition of the blend in the delaminated skin and the remaining core section is typically shown to be identical when analyzed by Infrared Spectroscopy, Differential Scanning Calorimetry and Scanning Electron Microscopy.

Polyamide/polyolefin blends as claimed in EP 235-876-A, for example, when applied to blends which are rich in polyamide, do not yield blends with a good 'macroscopic morphology', since it is recommended there that the polyamide needs to be more highly viscous than the unmodified and the modified polyolefin. Experience has further shown that neither improved gloss nor reduced discoloration are at all conclusive evidence for improved compatibility. Many polyamide/polyolefin blends have been made with excellent gloss and color, yet the 'macroscopic morphology' as described above was still insufficient. The problem is not so much the appearance of the visible outer surface rather than the adhesion of the often very homogeneous outer surface layer to the core material. To applicant's knowledge this issue has not been addressed in the prior art to polyamide/polyolefin blends claimed in this invention.

It has now been found that, in order to eliminate the tendency for delamination of the outer surface layer of injection molded articles in polyamide/polyolefin blends, the polyamide must be the continuous phase. This can be achieved by keeping the melt viscosity of the polyamide sufficiently low relative to the viscosity of the unmodified polyolefin and preferably the modified compatibilizers as well. Only then will the polyamide form the continuous phase throughout the whole cross section of injection molded articles, as long as sufficient shear mixing is provided during extrusion and subsequent injection molding.

SUMMARY OF THE INVENTION

According to the present invention there is provided a polymeric composition which comprises:

(a) 45%–88% by weight of a polyamide;

(b) 10%–25% by weight of an unmodified polyolefin;

(c) 0%–15% by weight of a carboxylic acid or derivative thereof grafted ethylene-propylene-diene polymer comprising 50%–80% by weight of ethylene, 10%–50% by weight of propylene, and 1%–10% by weight of a diene of 6–12 carbon atoms, and having an acid content of about 0.05%–3% by weight of the polymer; and (d) 2%–15% by weight of a carboxylic acid or derivative thereof grafted olefin polymer;

with the proviso that the melt viscosity of the polyamide is lower than the melt viscosity of the unmodified polyolefin.

Also provided is a filled polymeric composition wherein a filler is added to an aforesaid polymeric composition.

Further provided is a shaped article formed from the aforesaid unfilled or filled polymeric compositions.

DETAILED DESCRIPTION OF THE INVENTION

THE COMPONENTS a) Polyamides:

The polyamide, component (a), (PA), of this invention is well known in the art and embraces those semi-crystalline and amorphous resins having a molecular weight of at least 5000 and commonly referred to as nylons. Suitable polyamides include those described in U.S. Pat. Nos. 2,071,250; 2,071,251; 2,130,523; 2,130,948; 2,241,322; 2,241,322; 2,312,966; 2,512,606; and 3,393,210. The polyamide resin can be produced by condensation of equimolar amounts of a saturated dicarboxylic acid containing from 4 to 12 carbon atoms with a diamine, in which the diamine contains from 4 to 14 carbon atoms. Excess diamine can be employed to provide an excess of amine end groups over carboxy end groups in the polyamide.

Examples of polyamides include polyhexamethylene adipamide (nylon 6.6), polyhexamethylene azelaamide (nylon 6.9), polyhexamethylene sebacamide (nylon 6.10), and polyhexamethylene dodecanoamide (nylon 6.12), the polyamide produced by ring opening of lactams, i.e., poly-11-amino-undecanoic acid, bis(paraaminocyclohexyl) methane dodecanoamide. It is also possible to use in this invention polyamides prepared by the copolymerization of two of the above polymers or terpolymerization of the above polymers or their components, for example, an adipic, isophthalic acid hexamethylene diamine copolymer. Preferably the polyamides are linear with a melting point in excess of 200° C. Specifically, PA6.6, PA6, PA6.10, PA6.12, PA11, PA12, PA12.12, PA6/6.6 etc. may be used. Among these polyamides, PA6.6 and PA6 or blends of these two polyamides are particularly suitable and preferred.

In order to achieve 'macroscopic homogeneity' of polyamide/polyolefin blends it is important to choose a polyamide that is lower in melt viscosity than the other two or three polymeric components in the blend, namely the unmodified polyolefin and/or the modified olefin polymer and/or the modified elastomer, preferably having a capillary melt viscosity at 285° C. and 1000s–1 of 30 Pa.s or lower.

The percentage of polyamide in the compositions of present invention ranges from 45 to 88 weight percent. If less than 45 weight percent polyamide is used, the mechanical and thermal properties of the resulting resin will not be significantly different from the pure polyolefin. If more than 88 weight percent of polyamide is used, the reduction in moisture sensitivity is not significant enough. Preferably, the polyamide is present at a level of about 55 to 85% by weight, most preferably about 60 to 80% by weight.

b) Unmodified Polyolefins:

The unmodified polyolefins, component (b), in this invention can be either an unmodified propylene polymer or an unmodified ethylene polymer. The unmodified propylene polymer can be a homopolymer, a random-copolymer, a block-copolymer, blends of the above polypropylenes or a toughened polymer or a filled polymer of any of the above polypropylenes. For economic reasons, for highest flexural modulus and for highest heat distortion temperatures homopolypropylenes are most preferred. The unmodified ethylene polymer can be any polyethylene from very low density to very high density, as long as melt viscosity is within the specified range, whereby highmolecular polyethylenes are preferred for improved overall toughness.

The capillary melt viscosity at 285° C. and 1000s–1 of the unmodified polyolefin should be higher than the viscosity of the polyamide, preferably higher than 50 Pa.s, most preferably higher than 100 Pa.s. A melt viscosity of the unmodified polyolefin of higher than 100 Pa.s is especially preferable in combination with modified polypropylene. Modified polypropylene has usually a very low melt viscosity, due to the chain scissoning that occurs during modification. In this case, the combined melt viscosity of the unmodified and the modified polypropylene should be higher than 50 Pa.s. In the case of unmodified and modified polyethylene this is usually not a problem, since both resins can be made with very high melt viscosity.

The quantity of the unmodified polypropylene in the composition should be between 10 and 25 weight percent (preferably 15–25 weight percent) to add up, with between 2 and 15 weight percent of modified polypropylene, to a percentage of between 12 and 40 weight percent of total polypropylene. The type and content of the polyolefins will be governed by the goal physical properties for the blend composition.

Polyolefins such as polyethylenes and polypropylenes and their manufacture are also well known to those skilled in the art. Other olefin polymers of 4–8 carbon atoms can also be used either alone or preferably as copolymers with ethylene or propylene. Such higher olefin polymers and copolymers are also known in the art.

c) Modified Toughener:

The use of functionalized ethylene-propylene-diene monomer (EPDM) as toughener in polyamides has been described in U.S. Pat. No. 4,174,358. Functionalized EPDM does also act as a toughener in blends of the present invention, since the polyamide remains the continuous phase. Suitable functionalized tougheners (c) for the present invention are described in U.S. Pat. Nos. 3,884,882; 4,026,967; and Re 31,680. The most preferred tougheners for use in this invention are ethylene-propylene-diene polymers, comprising about 50 to 80 weight percent ethylene, 10 to 50 weight percent propylene and about 1 to 10 weight percent of one or different dienes of 6–12 carbon atoms, having a carboxylic acid content or derivatives thereof of about 0.05 to 3 weight percent of the polymer. The dienes most preferred are 1,4-hexadiene and/or norbornadiene.

The concentration of modified toughener should be between 0 and 15 weight percent (preferably 0–10 weight percent). Degree of functionality and concentration of the modified toughener will affect the balance of physical properties such as overall toughness, in particular notched Izod toughness, stiffness, thermal properties and shrinkage. If for a particular application improved toughness is not required, component (c) can in this invention be omitted. However, when a toughener should be added for improved toughness, it should only be used in combination with component (d) in this invention. Maleic anhydride is the preferred functionalizing agent for the modified toughener.

d) Modified Polyolefin:

The modified olefin polymer, component (d), in this invention, can be either an acid modified propylene polymer or an acid modified ethylene polymer. The modified olefin polymer is present in the compositions of the invention at a concentration of between 2 and 15 weight percent, preferably between 5 and 15 weight percent.

The base polymer for the modified propylene can again be a homopolymer, a random copolymer, a block copolymer or a toughened polymer or a filled polymer of any of the above described polypropylenes. Homopolymers and copolymers are preferred most. The base resin for the modified ethylene polymer can again be any polyethylene from very low density to very high density. There are no specific restrictions as to the melt viscosity of the precursor polyolefin; however, a melt index, measured at 2.16 kg and 190° C. of smaller than 1.5 g/10 min is preferred, which translates into a capillary melt viscosity at 285° C. and 1000 s−1 of >100 Pa.s.

The acid modified polyolefin, component (d), is graft modified with 0.05 to 3.0 weight percent, preferably 0.5 to 1 weight percent, of a carboxylic acid or a derivative thereof. The grafting of the polyolefin can be carried out in the melt state, in solution or in suspension as described in the state-of-the-art literature. The melt viscosity of the modified polyolefin is not restricted, however, most effective compatibilization with modified polypropylene is found if the melt index, measured at 2.16 kg and 190° C. is between 50 to 150 g/10 min and with modified polyethylene if the melt index, measured at 2.16 kg and 190° C. is smaller than 5 g/10 min, respectively. It is preferable that the combined melt viscosity of the unmodified polyolefin and the acid modified polyolefin should be higher than the melt viscosity of the polyamide, component (a). Maleic anhydride is the preferred functionalizing agent. Such modified polyolefins can be prepared as described, for example, in published European Patent Application Nos. 370,735 and 370,736.

e) Inorganic Filler:

There are no specific limitations as to the type and concentration of fillers that can be used in blend compositions of present invention. Preferred filler types are inorganic fillers such as glass fibers and mineral fillers or mixtures thereof. The preferred concentration of fillers in the filled composition is between 5 and 40 weight percent.

When a filler is added to a blend composition of the present invention, it is important to ensure, however, that the added filler does not negatively affect the preferred polyamide/polyolefin viscosity ratio. If a filler is added, for example, which reacts preferentially with the nylon phase only, the resulting increase in melt viscosity of the nylon phase would increase the tendency for poor homogeneity. To prevent this, it would therefore be necessary to add a filler to the polyolefin first prior to the addition to the low viscosity polyamide or by adding a filler to the polyamide/polyolefin blend simultaneously which reacts preferentially with the polyolefin phase.

The use of very low viscous polyamide, component (a), in blends of the present invention has the additional positive effect of improved wetting of any filler. Yet another positive effect is a very low melt viscosity of even highly filled blends, which allows injection mold articles with thin wall thicknesses and high flow lengths to be obtained.

f) Other additives:

The compositions of the present invention can contain one or more additives known in the art, such as thermal stabilizers, UV stabilizers and antioxidants, lubricants, flame retardants and colorants, as long as these additives do not offset the polyamide/polyolefin viscosity ratio.

In addition, the polymers themselves which are used in the composition may contain various additives as purchased from the manufacturers.

PREPARATION a) General Procedure:

To avoid excessive polymer degradation during compounding and injection molding, all polymer preblends and compounded blends are pre-dried to a moisture content below 0.15 weight percent.

The ingredients are then mixed in their proper proportions in a suitable vessel such as a drum or a plastic bag. The mixture is then melt blended in a single or twin screw extruder at a melt temperature, measured at the exit of the extruder die, of ca. 270° C. to 300° C. Melt temperatures below 270° C. are appropriate for polyamides which have a lower melting point than PA6.6, whereas melt temperatures significantly above 300° C. should be avoided to keep degradation of the polyolefin low. For good dispersion of the unmodified and modified polyolefin and the modified EPDM and other additives such as fillers, it is preferred to use a twin screw extruder with appropriate screw design. For specific reasons, it may be desirable to side-feed part of the ingredients downstream into the extruder. For filled polyamide/polyolefin blends it may be advantageous to melt blend the polymeric ingredients (a), (b), (c) and (d) first prior to the addition of the filler.

The compounded blend exiting the die is quenched in water, surface water is removed by compressed air, and then is cut into pellets. In case where the remaining moisture content of the finished product is higher than 0.15 weight percent, the material is dried in a dehumidifying or vacuum oven.

The dry material is then molded into test specimens using a standard injection molding machine. There are no specific restrictions as to the injection molding equipment. However, it is recommended to use a screw design which is typically used for semi-crystalline polymers such as polyamides or polyolefins. If the screw depth in the feeding and the metering zones is too deep and the compression ratio is too low, insufficient and inhomogeneous melting of the different components of the blend can result. Preferably a melt temperature of 270° C. to 285° C. and a mold temperature of 60° to 110° C. is used for blends based on PA6.6. For blends based on polyamides with lower melting points the melt temperatures have to be adjusted accordingly as is known in the art. Other important molding parameters such as injection and hold pressure and screw forward time are adjusted for optimum appearance of the molded specimens.

b) Measurement of Melt Viscosity

For the measurement of melt viscosity of the components of the polyamide/polyolefin blends of the present invention, two standardized methods are used.

For nylons, only capillary melt viscosity was measured at 285° C. and 1000 s−1 in a computerized Rosand Precision Capillary Rheometer. All resins were pre-dried to a moisture content of ca. 0.1%.

For the unmodified and modified polyolefins and the modified tougheners, melt index (MI) or melt flow index (MFI) at 2.16 kg load and 190° C., 230° C. or 280° C. according to ASTMD-1238 are usually preferred.

MI and MFI are therefore given for the characterization of melt viscosity of these components. However, in Table 1, capillary melt viscosities are also given for these components as determined for the nylons in order to allow comparability of viscosity ratios between all polymeric components.

As a third measure for viscosity of the nylons, Table 1 contains also values of relative viscosity as measured in 90% formic acid according to ASTMD-789-86 to allow correlation with capillary melt viscosity.

c) Qualitative Test For Macroscopic Morphology:

For judging the 'macroscopic morphology' of polyamide/polyolefin blends in injection molded articles, the sprue and the runner system of test specimens such a DIN or ASTM tensile bars are used. The used tool has one cavity for a DIN or ASTM tensile bar and two cavities for two DIN or ASTM flex bars. The conical sprue has a diameter of 5 mm at the tip and 8 mm at the bottom with a total length of 80 mm. The runner system is squared 8×8 mm and ca. 160 mm long on the side to the two flex bars and ca. 150 mm long on the side to the single tensile bar.

The test for a delaminatable skin, that is a skin that can be peeled off by means of a tool with more or less force, is to cut off a thin layer of material from the surface alongside the sprue and runner section as well as alongside the bars by means of a knife or a cutter. If there is a poorly adhering skin layer, it shows clearly in the cross section of such cuts or by pieces of the skin that chip off. This test is a qualitative test, nonetheless very effective in investigating 'macroscopic morphology'. It is important to do such a test not only on the molded test specimens, but also on the sprue and runner system, because the problem is normally highlighted there. It has been our experience that test specimens gated in a similar way as described above can have only very little delaminatable skin, while there is a severe tendency for delamination in the sprue or runner section.

It has been clearly found that the sprue section is most informative, that is most sensitive for monitoring morphology and it is the tip of the sprue where signs for delamination disappear last. 'Macroscopic morphology' of a polyamide/polyolefin blend continuously improves as the delaminatable skin is eliminated in the various sections in the following order: test specimen<runner system<total sprue<tip of sprue. In that sense, the 'macroscopic morphoolgy' of a blend that shows a delaminatable skin only in the sprue but not in the runner is clearly more homogeneous compared to a blend that shows a skin in the runner but not in the bars.

EXAMPLES AND TEST RESULTS

The following examples illustrate the invention wherein parts and percentages are by weight.

Ingredients Used For Examples 1 and 2

(Refer to ingredients in Table 1)

The polyamide 6.6 resins PA6.6#1 to #5 were polyamide 6.6 resins varying in molecular weight as expressed by relative and capillary melt viscosity. The lowest viscous PA6.6, giving consistently improved morphology, is PA6.6#5 with an RV of 23.6, as measured in 90% formic acid. The capillary melt viscosity of PA6.6#5 at 285° C. and 1000 s−1 was 12.2 Pa.s.

The two unmodified homopolypropylenes Homo-PP#1 and are very similar in terms of melt flow index, but were from two different sources. Their melt flow index, measured at 230° C. and 2.16 kg, was in the range of 1.0 to 3.0 g/10 min, which correlates to a capillary melt viscosity at 285° C. and 100 s-1 of ca. 107 Pa.s.

The two unmodified polyethylenes PE#1 and #2 were a LDPE based on a 93.7/6.3% copolymer of ethylene/butene and a 100% homopolyethylene respectively, having a melt index at 190° C. and 2.16 kg of respectively 0.6 and 5.0 g/10 min.

The three modified polypropylenes g-PP#1, #2 and #3 were all functionalized with maleic anhydride at concentrations of 0.55, 0.20 and 0.21 weight percent, differing also in melt flow index, measured at 230° C. and 2.16 kg, from 250 to 7 to 21 g/10 min, respectively.

The two modified polyethylenes g-PE#1 and #2 were very similar in terms of both weight percentage of maleic anhydride functionality of 0.8 to 1.0 and in terms of melt index, measured at 190° C. and 2.16 kg, of 1.0 to 2.0 g/10 min.

The modified EPDM g-EPDM#1 was based on 70.2/25.68/4.0/0.12% ethylene/propylene/1.4-hexadiene/norbornadiene. The maleic anhydride functionality was 0.2 to 0.4 weight percent.

The two antioxidants used were a metallic compound (AO#1) and a hindered amine (AO#2).

Preparation of Examples 1 and 2:

Only polymers with a moisture content of <0.15% were used. For each blend, all ingredients were tumble blended and fed as a total preblend into the rear of a 25 mm Berstorff twin screw extruder. Compounding was conducted at a feed rate of 5–15 kg/hr and a screw speed of 150 to 250 rpm. Barrel temperatures were set to get a melt temperature of the melt at the exit of the die of 270° C. to 285° C..

The extrudate exiting the die was quenched in water, the surface water on the strands removed by compressed air and cut into pellets. The pellets were then dried in a vacuum oven at 80° C. to 100° C. over night prior to injection molding of the test specimens with a mold temperature of 80° C. and a melt temperature of 275° C. to 280° C., respectively.

EXAMPLE 1

PA6.6/Homo-Polypropylene (Homo-PP) (Refer to resins 1A & 1B to 4A & 4B in Table 1)

In general, resins 1A to 4B in Table 1 show the effect of low viscous polyamide (PA6.6) in combination with different unmodified Homo-PP, modified polypropylene and modified elastomer on 'macroscopic morphology' in injection molded test specimens. Resins 1A, 2A, 3A and 4A are comparative blends based on high viscous polyamide (PA6.6), resins 1B, 2B, 3B and 4B are equivalent resins based on low viscous polyamide (PA6.6). Resins 1B, 2B, 3B and 4B are within the scope of the present invention. The test results for resins 1B, 2B, 3B and 4B, all based on low viscous PA6.6, clearly show a drastic improvement in 'macroscopic morphology' of injection molded specimens over equivalent resins 1A, 2A, 3A and 4A which differ only in that they are based on higher viscous PA6.6. The improvement in morphology is shown in combination with different modified polypropylenes and in combination with both a modified polypropylene and a modified EPDM elastomer.

EXAMPLE 2

PA6.6/Polyethylene (PE)

(Refer to resins 5A, 5B & 5C in Table 1)

Resins 5A, 5B and 5C in Table 1 show the effect of low viscous polyamide (PA6.6) in combination with unmodified PE and modified PE on 'macroscopic morphology' in injection molded test specimens. Resin 5A is a comparative blend based on high viscous polyamide (PA6.6), resins 5B and 5C are similar polyamide/polyethylene blends but based on low viscous PA6.6. Resins 5B and 5C are within the scope of this invention. The test results clearly show a significant improvement in 'macroscopic morphology' for the blends based on low viscous PA6.6.

|  | % H₂O | Relative Viscosity In 90% formic acid | MV Pa·s 285° C./ 1000s · 1 | Example No. 1A % | 1B % | 2A %| 2B % | 3A % | 3B % |
|---|---|---|---|---|---|---|---|---|---|
| PA6.6 #1 | — | 48–56 | — |  |  |  |  |  |  |
| PA6.6 #2 | 0.14 | 41.4 | 94.2 | 69.5 |  | 70.0 |  |  |  |
| PA6.6 #3 | 0.05 | 45.5 | 92.0 |  |  |  |  |  |  |
| PA6.6 #4 | 0.03 | 37.2 | 72.3 |  |  |  |  | 69.0 |  |
| PA6.6 #5 | 0.13 | 23.6 | 12.2 |  | 69.5 |  | 7.0 |  | 69.5 |
|  |  | Goal MFI g/10 min [230° C./2.16 kg] |  |  |  |  |  |  |  |
| Homo-PP #1 | — | 1.0–3.0 | 106.7 | 20.0 | 20.0 |  |  | 22.0 | 22.0 |
| Homo-PP #2 | — | 1.5 | 108.8 |  |  | 22.0 | 22.0 |  |  |
|  |  | Goal MI g/10 min [190° C./2.16 kg] |  |  |  |  |  |  |  |
| PE #1 | — | 0.6 | — |  |  |  |  |  |  |
| PE #2 | — | 5.0 | 158.6 |  |  |  |  |  |  |
|  | % MAn | Goal MFI g/10 min [230° C./2.16 kg] |  |  |  |  |  |  |  |
| g-PP #1 | 0.55 | 250.0 | <1.0 |  |  |  |  | 8.0 | 8.0 |
| g-PP #2 | 0.20 | 7.0 | 41.8 |  |  | 8.0 | 8.0 |  |  |
| g-PP #3 | 0.21 | 21.0 | 24.5 | 10.0 | 10.0 |  |  |  |  |
|  | % MAn | Goal MI g/10 min [190° C./2.16 kg] |  |  |  |  |  |  |  |
| g-PE #1 | 0.8–1.0 | 1.0–2.0 | — |  |  |  |  |  |  |
| g-PE #1 | 1.00 | 1.5 | 149.2 |  |  |  |  |  |  |
|  |  | Goal MFI g/10 min [280° C./2.16 kg] |  |  |  |  |  |  |  |
| g-EPDM #1 | 0.2–0.4 | 20.–5.0 | 141.4 |  |  |  |  |  |  |
| AO#1 | — | — | — |  |  |  |  |  |  |
| AO#2 | — | — | — | 0.5 | 0.5 | 0.5 | 0.5 | 0.5 | 0.5 |
| Extruder used for compounding |  |  |  |  |  |  |  |  |  |
| 25 mm Berstorff twin screw |  |  |  | x | x | x | x | x | x |
| 46 mm Buss Co-Kneader |  |  |  |  |  |  |  |  |  |
| Tendency for delamination in Injection molded Tensile- and Flex-bars |  |  |  |  |  |  |  |  |  |
| in conical sprue |  |  |  | v. much | v. little | v. much | v. little | v. much | v. little |
| in runner system |  |  |  | v. much | none | v. much | none | v. much | none |
| in Tensile- & Flex-bars |  |  |  | v. much | none | v. much | none | v. much | none |

|  | % H₂O | Relative Viscosity In 90% formic acid | MV Pa·s 285° C./ 1000s · 1 | Example No. 4A % | 4B % | 5A % | 5B % | 5C % |
|---|---|---|---|---|---|---|---|---|
| PA6.6 #1 | — | 48–56 | — |  |  | 59.8 |  |  |
| PA6.6 #2 | 0.14 | 41.4 | 94.2 |  |  |  |  |  |
| PA6.6 #3 | 0.05 | 45.5 | 92.0 |  |  |  |  |  |
| PA6.6 #4 | 0.03 | 37.2 | 72.3 | 66.0 |  |  |  |  |
| PA6.6 #5 | 0.13 | 23.6 | 12.2 |  | 66.0 |  | 69.5 | 69.5 |
|  |  | Goal MI g/10 min [230° C./2.16 kg] |  |  |  |  |  |  |
| Homo-PP #1 | — | 1.0–3.0 | 106.7 | 20.9 | 20.9 |  |  |  |
| Homo-PP #2 | — | 1.5 | 108.8 |  |  |  |  |  |
|  |  | Goal MFI g/10 min [190° C./2.16 kg] |  |  |  |  |  |  |
| PE #1 | — | 0.6 | — |  |  | 25.0 |  |  |
| PE #2 | — | 5.0 | 158.6 |  |  |  | 22.0 | 20.0 |
|  | % MAn | Goal MI g/10 min [230° C./2.16 kg] |  |  |  |  |  |  |
| g-PP #1 | 0.55 | 250.0 | <1.0 | 7.6 | 7.6 |  |  |  |
| g-PP #2 | 0.20 | 7.0 | 41.8 |  |  |  |  |  |
| g-PP #3 | 0.21 | 21.0 | 24.5 |  |  |  |  |  |
|  | % MAn | Goal MFI g/10 min [190° C./2.16 kg] |  |  |  |  |  |  |
| g-PE #1 | 0.8–1.0 | 1.0–2.0 | — |  |  | 15.0 |  |  |
| g-PE #1 | 1.00 | 1.5 | 149.2 |  |  |  | 8.0 | 10.0 |
|  |  | Goal MFI g/10 min |  |  |  |  |  |  |

| | | [280° C./2.16 kg] | | | | | | |
|---|---|---|---|---|---|---|---|---|
| g-EPDM #1 | 0.2–0.4 | 20.–5.0 | 141.4 | 5.0 | 5.0 | | | |
| AO#1 | — | — | — | | | 0.3 | | |
| AO#2 | — | — | — | 0.5 | 0.5 | | 0.5 | 0.5 |
| Extruder used for compounding | | | | | | | | |
| 25 mm Berstorff twin screw | | | | x | x | x | x | x |
| 46 mm Buss Co-Kneader | | | | | | | | |
| Tendency for delamination in | | | | | | | | |
| Injection molded Tensile- and Flex-bars | | | | | | | | |
| in conical sprue | | | | v. much | v. little | v. much | v. little | v. little |
| in runner system | | | | v. much | none | v. much | none | none |
| in Tensile- & Flex-bars | | | | v. much | none | v. much | none | none |

What is claimed is:

1. A polymeric composition which comprises:
   (a) 45–88% by weight of a polyamide;
   (b) 10–25% by weight of an unmodified polypropylene or unmodified polyethylene;
   (c) 0–15% by weight of a carboxylic acid or maleic anhydride-grafted ethylene-propylene-diene elastomer comprising 50–80% by weight of ethylene units, 10–50% by weight of propylene units, and 1–10% by weight of units of a diene of 6–12 carbon atoms, the sum of all these percentages being 100% by weight, and having a carboxylic acid or maleic anhydride content of 0.05–3% by weight of the elastomer; and
   (d) 2–15% by weight of a carboxylic acid or maleic anhydride grafted polyethylene or polypropylene; said polyamide having a capillary melt viscosity at 285° C. and $1000s^{-1}$ of less than 30 Pa.s, said melt viscosity being lower than the melt viscosity of the unmodified polyethylene or unmodified polypropylene and lower that the combined melt viscosity of the unmodified polyethylene or unmodified polypropylene and of the grafted ethylene-propylene-diene elastomer; and wherein the weight percentages for (a), (b), (c), and (d) are based on the total of (a), (b), (c), and (d) only:
   said composition forming during injection molding a continuous polyamide phase, and a dispersed phase comprising unmodified polypropylene or unmodified polyethylene.

2. A composition of claim 1 wherein the melt viscosity of the polyamide is lower than the viscosity of both the unmodified polypropylene or polyethylene and of the ethylene-propylene-diene polymer.

3. A polymeric composition according to claim 1 wherein the unmodified polypropylene or polyethylene has a capillary melt viscosity at 285° C. and $1000s^{-1}$ of at least 50 Pa.s.

4. A polymeric composition according to claim 1 wherein the grafted ethylene-propylene-diene polymer has a capillary melt viscosity at 285° C. and $1000s^{-1}$ of at least 100 Pa.s.

5. A polymeric composition according to claim 5 wherein the grafted ethylene-propylene-diene elastomer comprises 50–80% by weight of ethylene, 10–50% by weight of propylene, and about 1–10% by weight of a diene of 6–12 carbon atoms, the sum of all these percentages being 100% by weight, and has a carboxylic acid or maleic anhydride content of 0.05–3% by weight of the elastomer.

6. A polymeric composition according to claim 5 wherein the diene is at least one of 1,4-hexadiene and norbornadiene and the grafting agent is maleic anhydride.

7. A polymeric composition of claim 1 which comprises unmodified polypropylene and modified polypropylene, and wherein the combined melt viscosity of these two polymers is higher than 50 Pa.s.

8. A polymeric composition according to claim 1 wherein the carboxylic acid grafted polyethylene or polypropylene is a grafted propylene homopolymer or copolymer or a grafted ethylene homopolymer or copolymer having an acid content of 0.05–3% by weight of the polymer and having a a capillary melt viscosity at a temperature of 185° C. and a shear of 1000 $s^{-1}$ of more than 30 Pa. s.

9. A polymeric composition according to claim 8 wherein the acid grafted polyethylene or polypropylene is (a) an acid grafted polypropylene having a melt index measured at 2.16 kg and 190° C. in the range of 50–150 g/10 min. or (b) an acid grafted polyethylene having a melt index measured at 2.16 kg and 190° C. of less than 5 g/10 min.

10. A polymeric composition according to claim 1 wherein the composition comprises:
    (a) 60–80% by weight of polyamide;
    (b) 15–25% by weight of unmodified polyethylene or unmodified polypropylene;
    (c) 0–10% by weight of the acid-grafted ethylene-propylene-diene elastomer; and
    (d) 5–15% by weight of the acid grafted polyethylene or polypropylene.

11. A polymeric composition according to claims 1 wherein a filler is added in an amount of 5–40% by weight of the filled composition.

12. A composition of claim 1 in the form of a shaped article.

13. A polymeric composition which comprises:
    (a) 45–88% by weight of poly(hexamethylene adipamide;
    (b) 10–25% by weight of an unmodified polypropylene or unmodified polyethylene;
    (c) 0–15% by weight of a carboxylic acid- or maleic anhydride-grafted ethylene-propylene-diene elastomer comprising 50–80% by weight of ethylene units; 10–50% by weight of propylene units; and 1–10% by weight of units of a diene of 6–12 carbon atoms, and having a carboxylic acid or maleic anhydride content of 0.05–3% by weight of the elastomer; and
    (d) 2–15% by weight of a carboxylic acid- or maleic anhydride-grafted polypropylene or polyethylene; said polyamide having a capillary melt viscosity lower than that of the unmodified polypropylene or unmodified polyethylene at a temperature of 285° C. and a shear of $1000s^{-1}$; the ratio of the melt viscosity of said polyamide to the melt viscosity of said unmodified polypropylene or unmodified polyethylene, measured under the same conditions, being about 0.08 to 0.011, and wherein the weight percents for (a), (b), (c), and (d) are based on the total of (a), (b), (c), and (d) only.

* * * * *